Sept. 15, 1925.                                                          1,553,593
                         A. J. BROWN
                            CLUTCH
                       Filed May 9, 1921
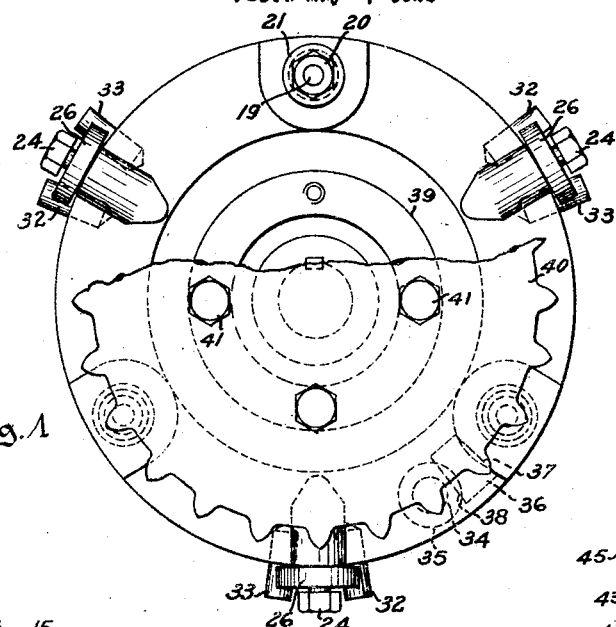
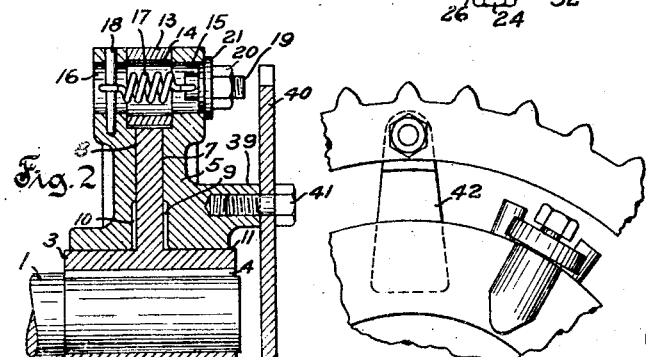
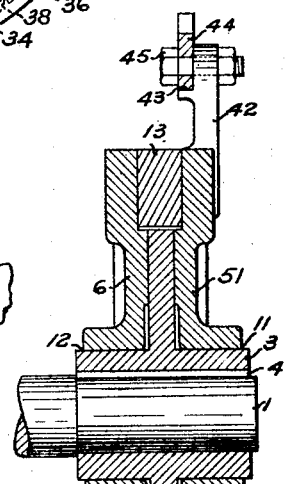
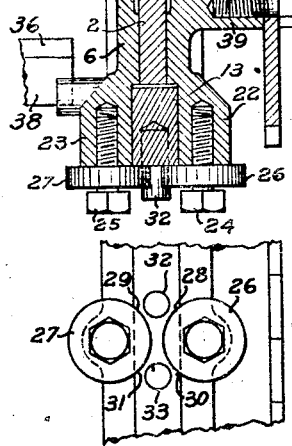
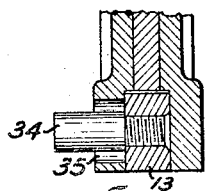
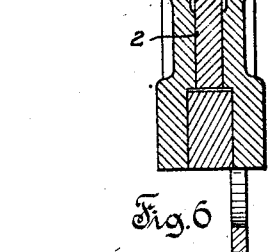
Inventor
A. J. Brown
by
Attorney Patented Sept. 15, 1925.

1,553,593

UNITED STATES PATENT OFFICE.

ARTHUR J. BROWN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CLUTCH.

Application filed May 9, 1921. Serial No. 467,928.

*To all whom it may concern:*

Be it known that ARTHUR J. BROWN, a citizen of the United States, residing at Milwaukee, in the county of Milwaukee and State of Wisconsin, has invented a certain new and useful Improvement in Clutches, of which the following is a specification.

This invention relates in general to clutches.

One of the objects of the invention is the provision of a clutch of simple and efficient form. Another object is the provision of a clutch which is automatically disengageable in certain positions of travel of the parts.

One of the uses to which the clutch may be put is in connection with parts having definite limits of travel and where the driving element may be constantly driven in one or another direction, the clutch providing means whereby the driven parts cannot be moved beyond the desired limits of travel. Such conditions may arise, for example where the driving element is differentially driven so that at one time it may be driven in one direction and at another time in the reverse direction. In case such a differentially driven member is to drive a controlling element, means must be provided whereby when the controlling element has reached its limit of travel in either direction, the driving connection between the differentially driven element and the controlling element will be interrupted. It is thus possible for the differentially driven element to continue its movement without actuating the controlling element.

Other objects will appear hereinafter as the description of the invention proceeds.

The novel features of the invention will appear from this specification and the accompanying drawings forming a part thereof and disclosing two embodiments thereof, and all these novel features are intended to be pointed out in the claims.

Fig. 1 is a front elevation of a clutch embodying the features of the invention, certain of the parts being broken away.

Fig. 2 is a vertical sectional view of the clutch illustrated in Fig. 1.

Figs. 3 and 4 are detailed views of the clutch.

Fig. 5 is a fragmentary front elevation of a modified form of clutch.

Fig. 6 is a vertical sectional view of a clutch of the type illustrated in Fig. 5.

The clutch, as best seen in Fig. 2, is associated with a shaft 1, which shaft drives a friction disk element 2, forming part of the clutch. The friction disk 2 is here shown as formed integral with a sleeve 3 in suitable driving relation with the shaft 1 as by means of a key 4. Associated with and disposed on opposite sides of the friction disk 2 are friction members 5, 6 having the friction surfaces 7, 8 respectively, cooperating with the associated surfaces of the friction disk 2. The surfaces of the members 5, 6 are preferably cut away at the radially inner ends of said members to form annular recesses 9, 10 respectively. These recesses enable a more certain contact to be made as between the friction members and the disk, one of the reasons being that the corner formed by one of the surfaces of the disk and the outer surface of the sleeve 3 is ordinarily not absolutely square.

The friction members 5, 6 are provided with axially extending holes 11, 12 respectively, which are bored so as to provide a rotating fit on the outer surfaces of the sleeve 3.

Between the radially outer ends of the friction members 5, 6 is disposed a floating ring 13. This ring is provided with a hole 14 in substantial registry with holes 15, 16 in the members 5, 6 respectively. These holes serve as spaces for disposing a spring 17, one end of which engages pin 18 passing transversely through the hole 16 and the other end of which engages a threaded pin 19. A nut 20 is provided on the threaded end of pin 19 which nut abuts against a washer 21 having a collar fitting within the hole 15. The spring 17 as thus disposed serves to resiliently hold the members 5, 6 in engagement with the friction disk 2, the degree of pressure as between these members being adjustable by means of the nut 20.

There may be any desired number of springs similar to spring 17, a corresponding number of holes being provided in the members 5, 6 and the floating ring 13. In the instance here shown, three such spring elements are provided equidistantly disposed around the periphery of the friction members.

The friction members 5, 6 are here shown as provided respectively with lugs 22, 23. Each lug is provided with radial threaded holes for taking threaded studs, as for example, studs 24, 25. These studs pass through holes in and serve to mount and hold in place the rollers 26, 27 respectively. As will be seen by inspection of Fig. 3 these rollers present oppositely inclined surfaces 28, 29 to a pin 32 here shown as radially disposed in the floating ring member 13. In like manner the opposite sides of the rollers 26, 27 present oppositely inclined surfaces 30, 31 to a pin 33 similarly disposed in the ring member 13.

The floating ring 13 is here shown, as will be seen by reference to Fig. 4, as provided with an axially extending pin 34 which passes freely through a hole 35 in the friction member 6. The hole 35 is sufficiently large to allow for a predetermined amount of necessary relative movement between the ring 13 and the friction members, having a purpose which will hereinafter appear. Depending upon the direction in which the ring 13 has been rotated, the pin 34 is adapted to engage either a surface 37 or surface 38 of a relatively fixed stop 36.

The friction member 5 is here shown as provided with an annular boss 39 which serves to carry a sprocket 40 fastened to the boss in any suitable manner as by means of the threaded studs 41.

The operation of the clutch is as follows:—

Assuming the parts to be in the position shown in Figs. 1 and 2 and the shaft 1 rotating in clockwise direction, as viewed in Fig. 1, inasmuch as the friction members 5, 6 are in engagement with the disk 2 the latter will carry the friction members along with it and with them the floating ring 13. Whatever controlling device that is connected to the sprocket 40, and so to the member 5, will thus be moved to perform its controlling function. In case this movement is sufficient in the clock-wise direction, which it would ordinarily be after rotation of 180° more or less, the rotation of the shaft 1 will stop. If conditions are at normal, the motion might continue until the parts have rotated almost 360° or until the pin 34 engages the surface 38 of the stop 36. When this occurs, the floating ring 13 being stopped, relative motion takes place as between said ring and the friction members 5, 6. Relative motion therefore also takes place as between the radially projecting pins, as for example pins 32, 33 and the associated rollers 26, 27. Depending upon the direction of rotation, one of the said pins will wedge in between the rollers thus forcing them apart and consequently also disengaging the friction members 5, 6 from clutching frictional engagement with the disk 2. Motion of shaft 1 in the clock-wise direction may therefore continue without driving the controlling means connected to sprocket 40, inasmuch as, under the conditions above noted, effective driving connection as between the shaft 1 and the controlling means is broken. In forcing the friction members 5, 6 apart the spring 17 has of course, been placed under increased tension. What has hereinbefore been stated in connection with one of the sets of rollers and associated parts of course applies in like manner to other duplicate parts. It is to be noted that although, under the conditions stated, effective driving connection as between members 5, 6 and disk 2 is broken, yet the sliding friction between these parts is enough to cause the respective pins to remain nudged between the associated rollers if the shaft 1 keeps on rotating in the same direction.

If now the direction of the motion of the shaft 1 is reversed so that the disk 2 rotates in a counter clock-wise direction, the springs 17, and other similar springs, pull the rollers, as 26, 27, back into their original position which action forces the particular pin which has been in engagement with the rollers out from between the latter. The friction members 5, 6 are thus returned to effective frictional engagement with the disk 2 and the shaft 1 and sprocket 40 are thus again in driving connection. As long as the shaft continues to rotate in a counter clock-wise direction, the sprocket 40 will be rotated in the same direction until either the shaft 1 stops or the parts reach a position such that the pin 34 engages the surface 37 of stop 36. When the latter occurs, driving connection between the shaft 1 and sprocket 40 is again broken in a manner similar to that already hereinbefore described.

Under certain conditions it may be desirable, if a sprocket is used to drive a chain for in turn driving the controlling mechanism, to so dispose the sprocket that the tension on the chain will not tend to exert any binding action as between the journal surface of the friction members 5, 6 in engagement with the outer surface of the sleeve 3. In accordance with this object a slight modification is illustrated in Figs. 5 and 6. In Fig. 6, friction member 51, corresponding to friction member 5 of Fig. 2, is of somewhat modified form. A sprocket 44 is here shown as carried by radial extensions 42 on member 51. The sprocket is disposed on the seats 43 provided on each radial extension 42, and may be bolted to said extensions as by bolts 45. In this construction, inasmuch as the sprocket and chain are in the same general plane as the journal surface of member 51, tension on the chain will exert no binding effect, as hereinbefore pointed out.

It should be understood that it is not desired to limit the invention to the exact details of construction shown and described, for obvious modifications will occur to a person skilled in the art.

It is claimed and desired to secure by Letters Patent:

1. In a clutch, rotatable means, a member drivable by said rotatable means, means for causing said drivable member to engage said rotatable means, a member rotatable with said drivable member, a roller carried by one of said members, and means carried by the other member for engaging said roller to cause disengagement of said drivable member and said rotatable means.

2. In a clutch, a rotatable friction disk, a pair of friction members disposed on opposite sides of said disk, which sides are perpendicular to the axis of rotation, and drivable thereby, spring means for causing said members to engage said disk, means disposed between said members and rotatable therewith, and means whereby when said means disposed between said members is moved with respect to said members, said members are caused to disengage said disk.

3. In a clutch, a friction disk rotatable in either direction, a pair of friction members disposed on opposite sides of said disk, which sides are perpendicular to the axis of rotation, and drivable thereby, spring means for causing said members to engage said disk, and means rotatable with said members for causing disengagement between the same and said disk, in either direction of rotation.

4. In a clutch, a rotatable friction disk, a pair of friction members disposed on opposite sides of said disk and drivable thereby, spring means for causing said members to engage said disk, a ring disposed between said members and rotatable therewith, and means whereby when said ring is moved with respect to said members, said members are caused to disengage said disk.

5. In a clutch, a rotatable friction disk, a pair of friction members disposed on opposite sides of said disk and drivable thereby, spring means for causing said members to engage said disk, a ring disposed between said members and rotatable therewith, a radially projecting pin on said ring, a pair of rollers disposed one on each of said members transversely to said pin whereby relative movement in one direction as between said members and ring causes said pin to wedge between said rollers and cause disengagement as between said members and disk.

6. In a clutch, a rotatable friction disk, a pair of friction members disposed on opposite sides of said disk and drivable thereby, spring means for causing said members to engage said disk, a ring disposed between said members and rotatable therewith, a pair of spaced radially projected pins on said ring in the general plane thereof, a pair of rollers disposed one on each of said members transversely to said pin and projecting into the path of said pins whereby relative movement in either direction as between said members and ring causes one or the other of said pins to wedge between said rollers and cause disengagement between said members and disk.

7. In a clutch, a rotatable friction disk, a pair of friction members disposed on opposite sides of said disk and drivable thereby, spring means for causing said members to engage said disk, a ring disposed between said members and rotatable therewith, a radially projecting pin on said ring a pair of oppositely inclined surfaces in the path of said pin one associated with each of said members whereby relative movement in a given direction as between said members and ring causes said pin to wedge between said surfaces and cause disengagement as between said members and said disk.

8. In a clutch, rotatable means, a pair of members operatively related to said rotatable means, means for causing said members to engage said rotatable means, means movable relatively to said members and rotatable therewith, a pair of rollers disposed one on each of said members and engageable by said means movable relatively to said members to cause disengagement as between said members and said rotatable means.

In testimony whereof, the signature of the inventor is affixed hereto.

ARTHUR J. BROWN.